No. 743,895.                                                    Patented November 10, 1903.

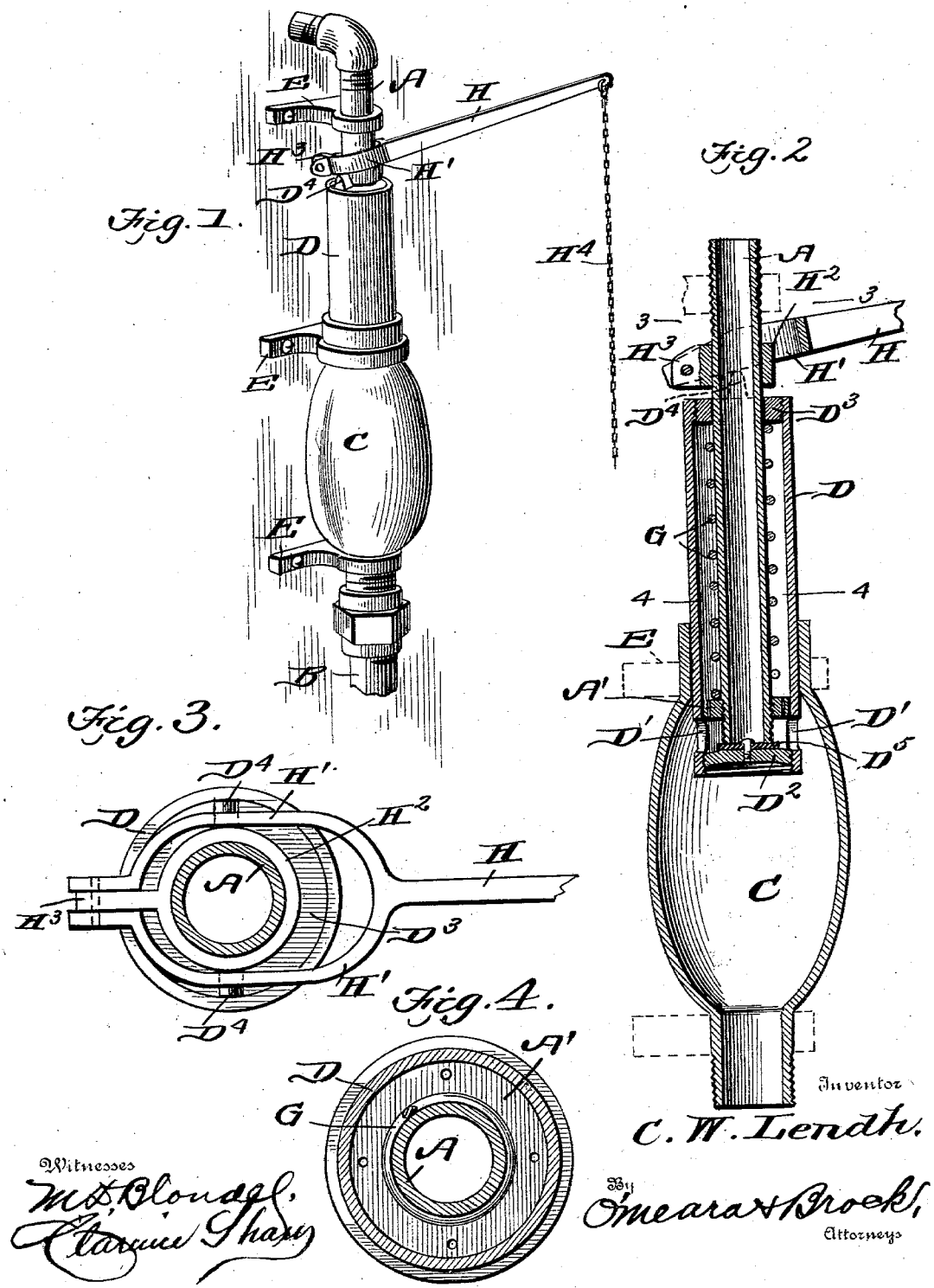

UNITED STATES PATENT OFFICE.

CHARLES W. LENDH, OF BROCKTON, MASSACHUSETTS.

FLUSH-VALVE.

SPECIFICATION forming part of Letters Patent No. 743,895, dated November 10, 1903.

Application filed January 19, 1903. Serial No. 139,596. (No model.)

*To all whom it may concern:*

Be it known that I, CHARLES W. LENDH, a citizen of the United States, residing at Brockton, in the county of Plymouth and State of Massachusetts, have invented a new and useful Flush-Valve, of which the following is a specification.

My invention is an improvement in flush-valves, and has for its object the construction of a simple valve which will take up but little room, be noiseless in operation, durable, and inexpensive. The float-valve requires a tank, which at times leaks, and the valve gets out of order and does not fill the tank or allows it to run over, and as these tanks always contain water they must be so located that they will not freeze during the winter.

In the accompanying drawings, Figure 1 is a perspective view showing my valve in position. Fig. 2 is a vertical longitudinal section showing the position of the various parts when the supply-pipe is closed. Fig. 3 is a section about on the line 3 3 of Fig. 2, showing the manner in which the operating-lever is pivoted. Fig. 4 is a cross-section through the supply-pipe and sliding section about on the line 4 4 of Fig. 2.

In the drawings above described, A represents the pipe from the main; B, the flush-pipe; C, an oval section having elongated ends, and D a straight cylindrical section surrounding the lower end of the pipe A and telescoping into the oval section. These various parts are supported by brackets E, secured to the wall. The pipe A may be exteriorly threaded where it passes through the upper bracket and is also threaded adjacent its lower end.

The sliding sleeve D has an interior diameter greater than the exterior diameter of the pipe A and is interiorly threaded adjacent each end. Adjacent its lower end and just above the threaded portion are formed apertures D'. An end plate $D^2$ is threaded into the lower end of the sleeve, and on the upper side of same is a rubber packing-disk $D^5$, against which the lower end of the pipe A normally rests. A perforated collar A' is threaded on the lower end of the pipe A, and collar $D^3$ is threaded into the upper end of the sleeve, the collar $D^3$ sliding on the pipe A and the sleeve sliding on the collar A'. Both pipe and sleeve extend into the oval section C of the exterior of the sleeve, slidingly fitting into the upper elongated neck of the oval section.

A coiled spring G surrounds the pipe A within the sleeve, bearing at its upper end against the collar $D^3$ and at its lower end against the collar A'. The lower neck of the oval section is exteriorly threaded, and the flush-pipe B is threaded thereon.

An operating-lever H is bifurcated at its rear end, forming two rearwardly-extending arms H', which loosely inclose the pipe A and a collar $H^2$, and in the rear of the pipe the arms H' are pivoted to an arm $H^3$, extending rearwardly from the collar $H^2$ between the arms H'. Upwardly-projecting lugs $D^4$ are formed on the collar $D^3$ beneath the arms H' and serve as fulcrum-points. A chain $H^4$ is attached to the outer end of the lever.

The operation of my device is as follows: The lever being drawn down, the lugs $D^4$ are forced downward by the pressure of the arms H', thus sliding the collar $D^3$ down the pipe A, compressing the spring G and forcing the sleeve D farther into the section C, throwing the valve $D^2$ away from the lower end of the pipe, and permitting the water to escape through the apertures D' and thence through the oval into the flush-pipe. As soon as the chain is released the spring G will return the parts to their normal position.

Having thus fully described my invention, what I claim as new, and desire to secure by Letters Patent, is—

1. The combination with a supply-pipe, of a flushing-pipe, an oval section having elongated neck portions positioned between the supply and flush pipes, the supply-pipe extending into the oval section, a sleeve surrounding the lower portion of the pipe-section said sleeve being closed at the lower end and adapted to close the lower end of the supply-pipe and having lateral apertures adjacent the lower end, a collar threaded into the upper end of the sleeve and adapted to slide on the supply-pipe, means for forcing the closed end of the sleeve away from the discharge-pipe, and means for returning it to its original position.

2. A flushing-valve comprising a sleeve having an end piece threaded into its lower end and lateral apertures adjacent the said end piece, an oval-shaped pipe-section inclosing the lower portion of said sleeve, a sup-ply-pipe extending into the sleeve its lower end being normally closed by the bottom of the sleeve, and means for forcing the sleeve inwardly with reference to the oval section thereby unclosing the end of the pipe-section, and means for returning the sleeve to its normal position.

3. In a flushing-pipe, the combination with a supply-pipe, of a sleeve encircling the lower portion of same, the bottom of the sleeve normally closing the lower end of the pipe, a collar threaded into the upper end of the sleeve and adapted to slide on the pipe, a collar threaded onto the pipe adjacent its lower end, an enlarged pipe-section inclosing the lower portion of the sleeve, said sleeve having apertures opening into the enlarged section, upwardly-extending lugs carried by the collar at the upper end of the sleeve, a leather bearing on said lug and adapted to force the collar to slide on the pipe and a spring bearing at its upper end, on said collar and at its lower end against the collar threaded to the pipe.

CHARLES W. LENDH.

Witnesses:
OSCAR W. SMITH,
MAURICE A. LONG.